United States Patent [19]
Ross et al.

[11] 3,855,508

[45] *Dec. 17, 1974

[54] ELECTRICAL CAPACITORS HAVING SUBSTITUTED ESTER IMPREGNANTS

[75] Inventors: Sidney D. Ross, Williamstown; Manuel Finkelstein, North Adams, both of Mass.

[73] Assignee: Sprague Electric Company, North Adams, Mass.

[ * ] Notice: The portion of the term of this patent subsequent to June 19, 1990, has been disclaimed.

[22] Filed: June 13, 1973

[21] Appl. No.: 369,677

Related U.S. Application Data

[63] Continuation-in-part of Ser. No. 195,856, Nov. 4, 1971, Pat. No. 3,740,625.

[52] U.S. Cl.............. 317/259, 252/63.7, 317/258
[51] Int. Cl............................................. H01g 3/21

[58] Field of Search ............ 317/258, 259; 252/63.7

[56] References Cited
UNITED STATES PATENTS

| 1,895,376 | 1/1933 | Clark | 317/258 |
|---|---|---|---|
| 1,966,163 | 7/1934 | Clark | 317/258 |

Primary Examiner—E. A. Goldberg
Attorney, Agent, or Firm—Connolly and Hutz

[57] ABSTRACT

Esters having substituents around the ester grouping to effectively prevent hydrolytic attack are used as impregnants in AC and energy storage capacitors. Appropriate substitution on an adjacent member of an aromatic ring or on either the acid or the alcohol moieties of the ester insures the hydrolytic stability of the esters.

8 Claims, 1 Drawing Figure

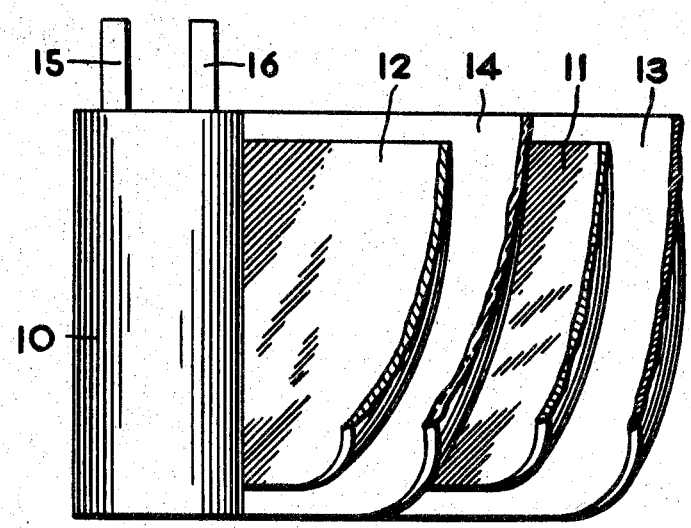

3,855,508

ELECTRICAL CAPACITORS HAVING SUBSTITUTED ESTER IMPREGNANTS

CROSS-REFERENCE TO RELATED APPLICATION

This application is a continuation-in-part of Ser. No. 195,856 filed Nov. 4, 1971 and issued June 19, 1973 as U.S. Pat. No. 3,740,625.

BACKGROUND OF THE INVENTION

This invention relates to electrical capacitors having ester impregnants, and more particularly to such capacitors wherein the esters have substituents so as to substantially surround the ester linkage.

Dielectric oils for AC and energy storage capacitors must have the physical characteristics: 1) Freezing point and pour point below −40°C; 2) Negligible vapor pressure at 125°C and 100 microns; 3) Flash point greater than 350°F; and 4) A viscosity of 1,000 centipoises or less at 100°C. The required electrical parameters are: 1) a dielectric constant greater than 2.4 but smaller than 10; 2) a volume resistivity in excess of $10^{10}$ ohm-cm; and 3) a power factor of less than 0.1 percent and preferably less than 0.05 percent.

Many esters are capable of meeting the foregoing requirements, but have been used infrequently in capacitors because of chemical and economic reasons. The principal chemical reason is that most esters lack sufficient hydrolytic stability. In the presence of water or hydroxide ion, the ester is in equilibrium with its components — namely, an acid and an alcohol. The hydrolysis generates an acid which decreases the resistivity of the dielectric oil and promotes degradation of the capacitor.

The hydrolysis of an ester involves attack by water or hydroxide ion at the carbonyl carbon atom. The reaction can be both acid and/or base catalyzed, but a typical dielectric fluid would be essentially neutral, so that the hydrolysis of concern would involve attack by a neutral water molecule. But such attack can be significant, particularly at the elevated temperatures at which capacitors frequently must operate.

Recently, polyolefin film capacitors, for example polypropylene, have been reported to be capable of being fully impregnated with a halogenated aromatic compound having from one to five chlorine substituents and from one to three aryl groups. It has been determined, however, that it is only with extreme difficulty that this type of capacitor can be impregnated, even when employing a paper dielectric as a wick in conjunction with the polypropylene film.

In view of this difficulty, it has been found necessary in the impregnation of commercial capacitor units to employ with the polypropylene film a porous cellulosic dielectric, e.g., Kraft paper, and also to employ special heat cycling procedures after initial impregnation in order to achieve maximum impregnation. Such practices obviously increase the cost of the capacitor unit.

Accordingly it is an object of the present invention to provide electrical capacitors having ester impregnants that are virtually insensitive to hydrolytic attack.

It is another object of this invention to provide polypropylene film capacitors having ester impregnants that mesh and fit well with the highly branched molecular structure of the polypropylene film.

SUMMARY OF THE INVENTION

In accordance with the present invention there is provided an impregnated capacitance section sealed within a capacitor housing means. The capacitance section comprises at least a pair of electrodes with a dielectric spacer between the electrodes. The capacitor is fully impregnated with at least a major proportion of appropriately substituted esters. The esters are made virtually insensitive to hydrolytic attack by surrounding the carbonyl carbon atom by appropriate substitutents. The introduction of two or even one alkyl substituents at the $\alpha$ position of the acid or the $\beta$ position of the alcohol gives an ester sufficient hydrolytic stability to be useful as a dielectric fluid.

The substituted esters used therein mesh and fit well with the highly branched molecular structure of the polypropylene film that has recently been used in some capacitor applications.

BRIEF DESCRIPTION OF THE DRAWING

The sole Figure of the drawing is a plan view of a partially unrolled capacitor section of this invention.

DESCRIPTION OF THE PREFERRED EMBODIMENT

The drawing illustrates a capacitance section 10 of the type with which the present invention is concerned. This section 10 is positioned within a capacitor container or housing means (not shown) and impregnated with the fluid dielectric of the present invention. Section 10 comprises a convolutely wound section having metal electrodes 11 and 12 separated by dielectric spacers 13 and 14, such as polypropylene film or Kraft paper. The capacitance section has electrode tabs 15 and 16 which are in contact with electrodes 11 and 12, respectively, and which thereafter make contact to terminals at the underside of a conventional capacitor can cover assembly.

Esters can be used advantageously as dielectric fluids according to this invention by providing an ester with a substituent on the adjacent member of an aromatic ring, i.e. on the position ortho to the ester group, wherein the substituent is an alkyl group. An alternative substitution is to provide an ester with a substituent or substituents on alkyl chains that are either $\alpha$ to the ester carbonyl group or $\beta$ to the ester either linkage. Such substitution effectively renders the ester impervious to hydrolytic attack by water or hydroxide ion, and makes the ester more compatible with a polyolefin film such as polypropylene.

The hydrolysis of an ester involves attack by water or hydroxide ion at the carbonyl carbon atom. The reaction can be both acid and base catalyzed, but a typical dielectric fluid would be essentially neutral, and the hydrolysis of concern would involve attack by a neutral water molecule.

Most of the esters with the desired substituents for this invention can be made by normal acid catalyzed esterification, using benzene, toluene or xylene to entrain the water formed and to shift the equilibrium in the direction of the ester. In the more difficult cases, the acid can be converted to the acid chloride, usually by reaction with thionyl chloride, and reacted with the alcohol in an inert solvent such as benzene in the presence of a base such as pyridine to produce the ester.

Advantageously, the esters used in this invention should have a dielectric constant greater than 2.4 but smaller than 10. A dielectric constant in excess of 10 will frequently indicate an ester having ionic contaminants present that are very difficult, if not presently impossible, to remove. Since most pure hydrocarbons have a dielectric constant close to two, the origin of the higher dielectric constants is the dipole moment of the ester grouping. Therefore, esters having significantly more or significantly less alkyl substitution than those cited above would still have dielectric constants of the appropriate magnitude.

The flash points of esters can be increased by increasing the molecular weight and thus decreasing the volatility, and esters with flash points in excess of 450°F are plentiful. As a class, the esters have low viscosities, and esters having flash points in excess of 500°F frequently have viscosities of less than 10 centipoises at 210°F.

It is more advantageous to impregnate the capacitance section with a liquid dielectric, and particularly a liquid dielectric that does not set upon standing. The setting of a dielectric produces air spaces or air gaps therein that inhibit complete impregnation and result in failure of the capacitor under voltage because of sparking and corona. Therefore, when using esters herein that are solids, it is preferred that blends are prepared with other liquid esters within the scope of this invention so as to ensure that the ester to be used as the impregnant is in liquid form.

We have found the following classes of esters to be suitable for use as dielectric fluids in the capacitors of this invention.

1.) 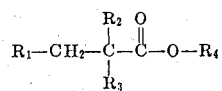

wherein $R_1$ is $C_6–C_{12}$, $R_4$ is $C_6–C_{12}$, $R_2$ is $CH_3$ or $C_2H_5$ or H, and $R_3$ is $CH_3$ or $C_2H_5$ or H, but both $R_2$ and $R_3$ cannot be H. Preferred compounds of this class are hexyl neodecanoate, hexyl neotridecanoate, butyl neoheptanoate, and heptly pivalate.

2.) 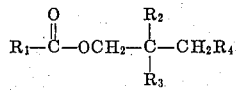

where $R_1$ is $C_3–C_{12}$, $R_4$ is $C_3–C_{12}$, $R_2$ is $CH_3$ or $C_2H_5$ or H, $R_3$ is $CH_3$ or H, but both $R_2$ and $R_3$ cannot be H. A preferred compound of this class is isooctyl palmitate.

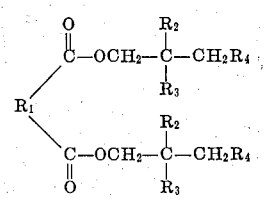

wherein $R_1$ is $C_2–C_{12}$ alkyl group, $R_4$ is $C_3–C_{12}$, $R_2$ is $CH_3$ or $C_2H_5$ or H, $R_3$ is $CH_3$ or $C_2H_5$ or H, but both $R_2$ and $R_3$ cannot be H. Preferred compounds of this class are di-(2 ethyl hexyl) adipate, di-isooctyl sebacate, isooctyl isodecyl adipate, di-isodecyl adipate, and di-2-ethyl butyl azelate.

For the capacitor applications of this invention, it is not essential to have a single pure compound as the dielectric fluid. Blends and mixtures thereof frequently result in advantageously lower viscosities and lower pour points than the individual compounds mixed therein. Blends and mixtures permit the use of mixed acid and/or mixed alcohol stocks readily available from the chemical and petrochemical industry for the preparation of the desired esters. This, or course, is more economical than using the pure compounds.

Some available acids that can advantageously be used as starting materials for the purposes of this invention include: the neo-acids, 2-methylpentanois acid; 2-ethylbutyric acid; 2-ethylhexanoic acid; phthalic acid; and pyromellitic acid. Available alcohols include: 2,2,4-trimethylpentanol; 2-methylpentanol; 2-ethylhexanol; 2-ethylisohexanol; neopentylglycol; and 2-ethylbutanol.

These appropriately substituted starting materials are readily available and/or can easily be made. Amongst the chemical processes capable of making these are the "Oxo" process for the preparation of branched alcohols, and the catalyzed addition of carbon monoxide to olefins to form neo-acids.

The freezing point of these esters should be below −40°C, while the vapor pressure should be negligible at 100 microns and 125°C for paper capacitors and at 100 microns and 100°C for plastic film capacitors. The viscosity must not exceed 1,000 centipoises at the impregnation temperature (125°C for paper capacitors and 100°C or less for film capacitors). The power factor of these materials should be less than 0.1 percent for paper and less than 0.05 percent for film capacitors. Also, a flash point in excess of 350°F is needed.

The polymer films contemplated by the present invention include polypropylene, polyethylene, polystyrene, etc. It is preferred to employ isotactic polypropylene of fairly high purity. This type of polypropylene is presently commercially available from several different sources. For some purposes it is advisable to employ in conjunction with the polymer film a porous cellulosic type spacer to assist in impregnation and to act as a wick for the liquid impregnant. A commonly employed material for this purpose is Kraft paper.

It is also contemplated that one or both of the capacitor electrodes may be in the form of a thin metallization on the surface of the polymer film. An example of this form is aluminized polypropylene. And further, the capacitor electrodes may be in the form of a thin metallization on each surface of a porous paper such that the metallization on one surface thereof contacts the metallization on the other surface, the electrodes being separated by a plastic film dielectric. Because the esters of this invention are so stable, they should not produce any acid, and therefore are advantageously compatible with metallized electrodes, unlike the chlorinated hydrocarbon impregnant used in the prior art.

What is claimed is:

1. An electrical capacitor comprising a capacitance section having at least a pair of electrodes with a dielectric spacer between said electrodes, said section being impregnated with a liquid dielectric comprising at least one ester having a substituent on a position selected from the group consisting of a) on the acid side, only alkyl chains substituted on the carbon atom α to the ester carbonyl group; and b) on the alcohol side, alkyl chains substituted on at least two positions on the carbon atom β to the ester ether linkage.

2. The capacitor of claim 1 wherein said liquid dielectric comprises at least one substituted ester of the formula

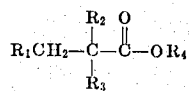

wherein $R_1$ and $R_4$ are $C_6$–$C_{12}$; and $R_2$ and $R_3$ are selected from $CH_3$, and $C_2H_5$.

3. The capacitor of claim 1 wherein said liquid dielectric comprises at least one substituted ester of the formula

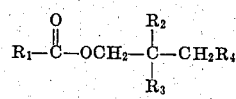

wherein $R_1$ and $R_4$ are $C_3$–$C_{12}$; $R_2$ is selected from $CH_3$, $C_2H_5$, and H; $R_3$ is selected from $CH_3$ and H; and at least one of $R_2$ and $R_3$ is not H.

4. The capacitor of claim 1 wherein said liquid dielectric comprises at least one substituted ester of the formula

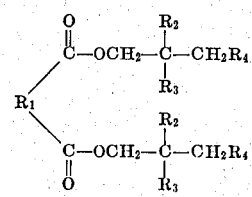

wherein $R_1$ is $C_2$–$C_{12}$ alkyl group; $R_4$ is $C_3$–$C_{12}$; and $R_2$ and $R_3$ are selected from $CH_3$, $C_2H_5$ and H, with both $R_2$ and $R_3$ not H.

5. The capacitor of claim 1 wherein said electrodes are in the form of a thin metallization on each surface of a porous paper.

6. The capacitor of claim 1 wherein said dielectric spacer is a polyolefin film and wherein at least one of said electrodes is in the form of a metallized layer deposited on a surface of said polyolefin film.

7. The capacitor of claim 6 wherein said metallized layer is aluminum.

8. The capacitor of claim 1 wherein said dielectric spacer is polypropylene film.

* * * * *